May 5, 1931.  R. L. R. WILD  1,803,448
FRICTION MATERIAL
Filed Nov. 29, 1929  5 Sheets-Sheet 1
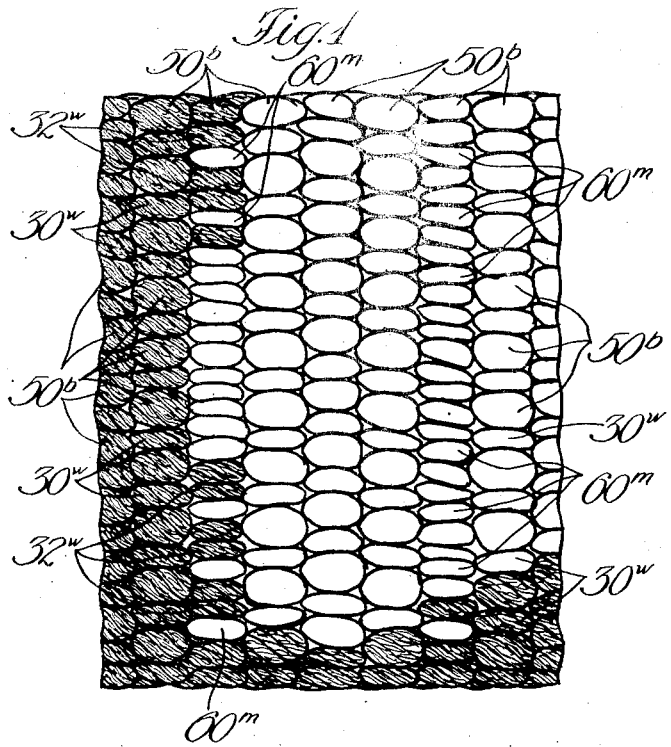
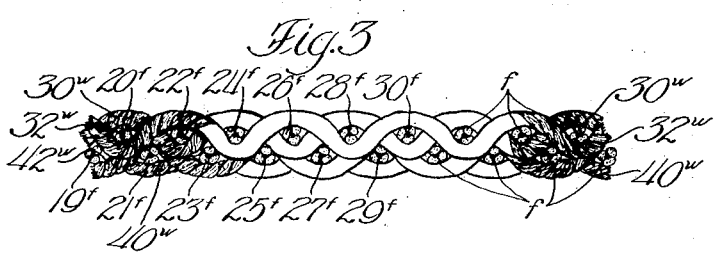
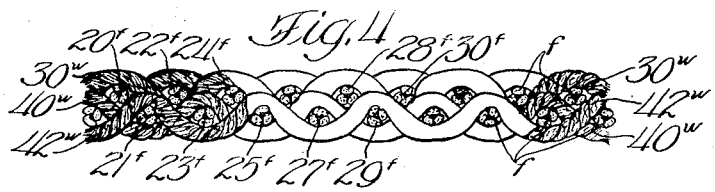
Inventor:
Rudolf L. R. Wild
By Williams, Bradbury, McCaleb & Hinkle
Attys.

May 5, 1931.  R. L. R. WILD  1,803,448
FRICTION MATERIAL
Filed Nov. 29, 1929   5 Sheets-Sheet 3
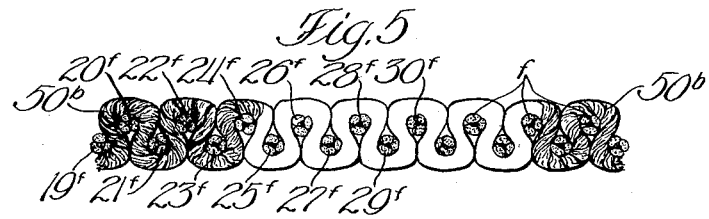
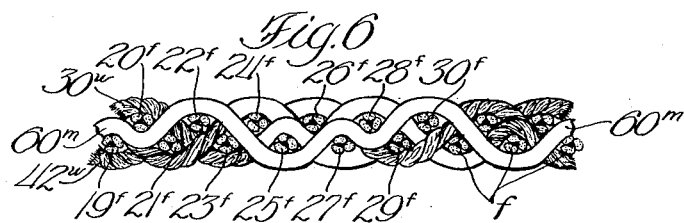
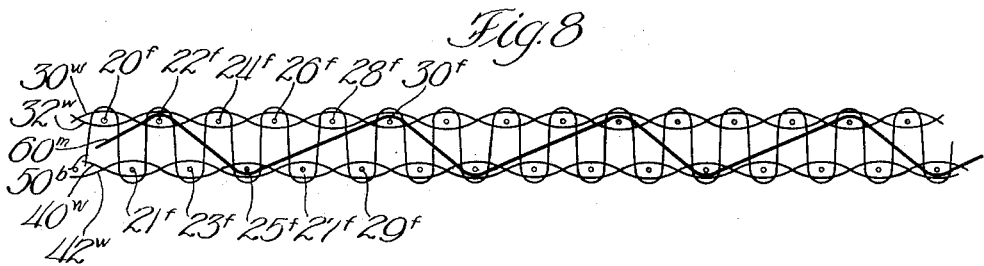
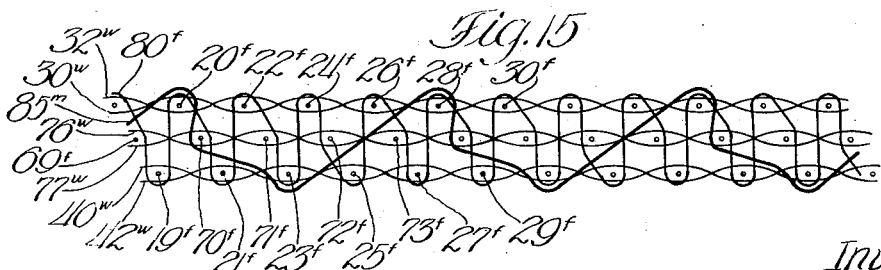
Inventor:
Rudolf L. R. Wild
By Williams, Bradbury, McCaleb & Hinkle
Attys.

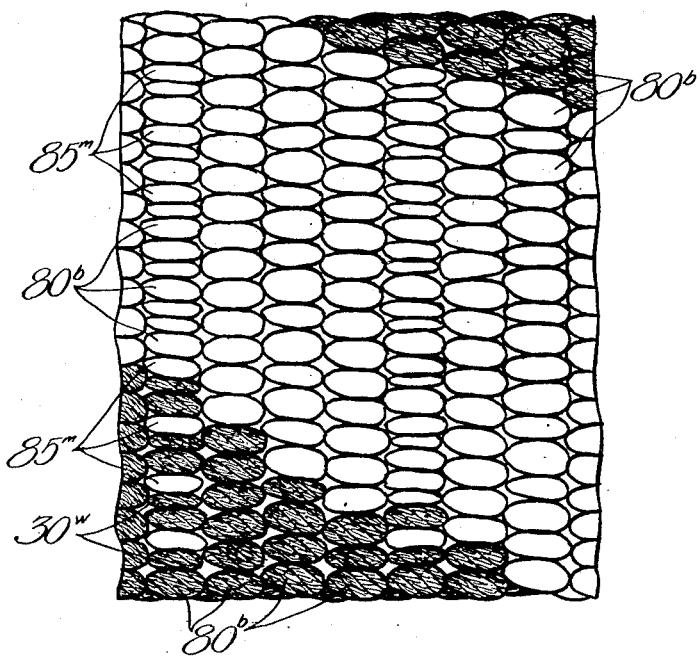
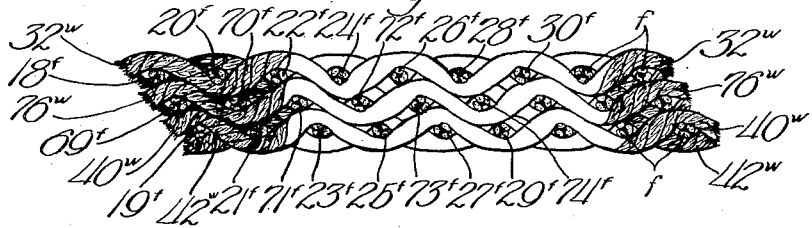
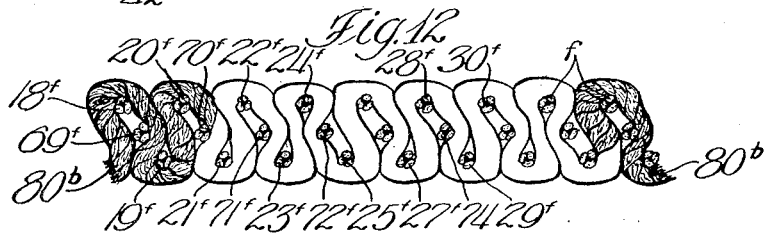

May 5, 1931.  R. L. R. WILD  1,803,448
FRICTION MATERIAL
Filed Nov. 29, 1929  5 Sheets-Sheet 5
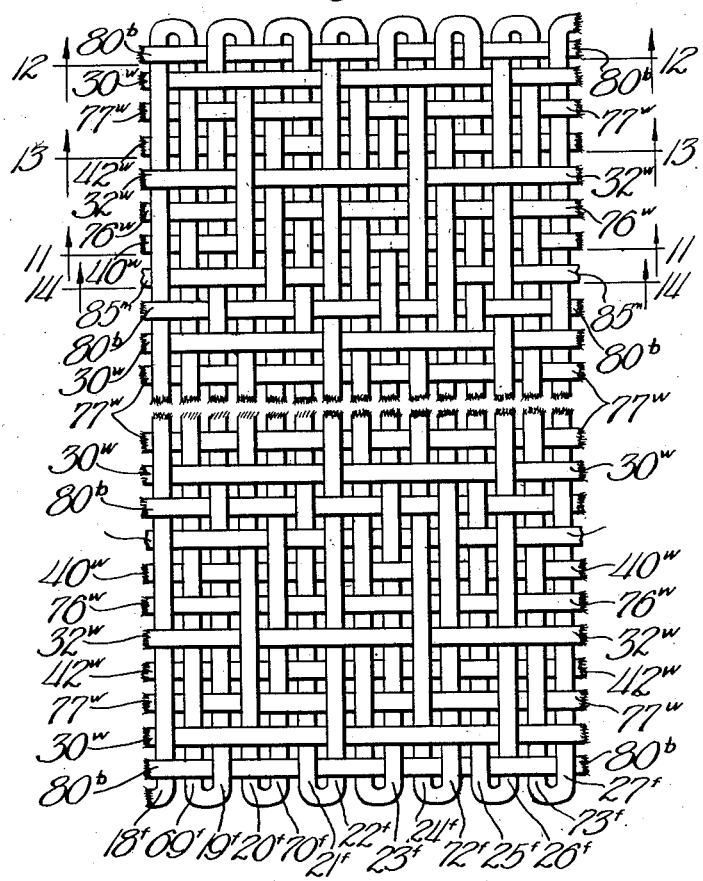
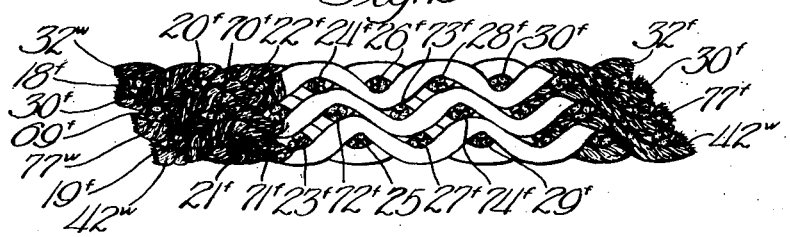
Inventor:
Rudolf L. R. Wild
By Williams, Bradbury, McCaleb & Hinkle
Attys.

Patented May 5, 1931

1,803,448

UNITED STATES PATENT OFFICE

RUDOLF L. R. WILD, OF CHICAGO, ILLINOIS, ASSIGNOR TO UNION ASBESTOS & RUBBER COMPANY, OF CHICAGO, ILLINOIS, A CORPORATION OF ILLINOIS

FRICTION MATERIAL

Application filed November 29, 1929. Serial No. 410,625.

The present invention relates to friction materials, and is particularly concerned with friction materials adapted to be used for the frictional resistive lining or facing of clutches, brakes, and the like.

The friction resistive material used in brakes, clutches, and the like, is often subjected to very severe conditions of temperature and pressure, such as, the conditions caused by a severe and prolonged braking action, or a rapid succession of brake applications at high speeds or on long hills. The heat generated on such occasions cannot be dissipated with sufficient rapidity by the devices of the prior art, and the instantaneous temperature at the frictional surface may become so high that particles of the friction lining on the surface may fuse and combine chemically with other materials present, to form chemical compounds which change the braking characteristics and cause erosion of the drum or other metal surface with which the friction lining cooperates.

As a result, it has been found that abrasive products, such as silica, carbides, slags, etc., are formed on the surface of the friction resistive material, and these products are in the form of extremely hard bodies, having sharp cutting edges which cut and score the brake drum or other metal surface. This is particularly true if high carbon steel drums are used, and actual analysis of the products present at the friction surface of a lining on such a scored drum shows that many different forms of silicates, slags, and carbides of an abrasive nature are present upon the friction materials of the prior art, but are noticeably absent from drums and friction linings which are constructed according to the present invention.

One accepted explanation of the presence of these abrasive particles and the scoring action of the friction materials of the prior art is the chemical combination of certain materials known to be present in the friction lining or upon its surface, and capable, under the influence of high temperature and pressure, of combining chemically to form the abrasive slags, silicates, and/or carbides, which are found at the surface of the scoring lining, and while this theory is set forth insofar as it has been developed at this time, I do not wish to limit myself to any specific theory or hypothesis for explaining this phenomenon.

For example, the ordinary brake linings of the prior art generally include asbestos fibers or chrysotile, and an exemplary analysis of the chemical composition of chrysotile is as follows:

*Asbestos (Chrysotile-Canadian) analysis*

|  | Percentages |
|---|---|
| $SiO_2$ (Silica) | 40.49 |
| $Al_2O_2$ (Alumina) | 1.27 |
| $Fe_2O_3$ (Iron) | 2.53 |
| MgO (Magnesia) | 41.41 |
| $H_2O$ (combined water) | 14.06 |
| Miscellaneous | 0.24 |
| Total | 100.00 |

There is also present in the woven friction lining a certain amount of cotton twisted in with the asbestos fibers to give the asbestos fibers better spinning qualities, and there may be particles of abraded steel from the drum, and dezinced brass wire; that is, brass wire from which the zinc has been removed by heat or pressure incident to the braking action, consequently, leaving the wire largely copper. There may also be present particles of carbon in the form of abraded steel, carbonized cotton, or carbonized tung oil.

From the foregoing, it will be evident that the dehydration of the asbestos under heat and pressure may cause any of the three elements, namely, silicate, alumina or iron, to combine with an alkali, such as magnesia, forming a magnesium silicate, as for instance, $3MgO, 2SiO_2, 2H_2O$, but as a matter of fact, it is impracticable to state definitely the chemical reactions which take place in every case. It is also known that silica, carbon, and particles of steel may be fluxed by the application of heat and pressure to form a flux and some slag, which may also consist of abrasive particles of the type found upon the friction linings used with scored drums in the device of the prior art.

One of the objects of the present invention is the provision of an asbestos brake lining which is provided with an inhibitive agent for preventing the formation of abrasive particles by the intense heat and pressure which is developed at the friction surface.

Another object is the provision of an improved friction lining which is adapted to withstand the most severe conditions of wear and temperature without scoring of the metal friction surface, particularly on low carbon steel drums or the like.

Another object is the provision of a flexible friction lining which has all of the advantages of both molded linings and flexible linings, in that the lining is sufficiently flexible to fit drums of any size and to be practically noiseless, and it also possesses a high degree of accuracy in thickness, giving a better fit than the flexible linings of the prior art.

Another object is the provision of an improved friction material, including an inhibitive agent, such as lead, in which the lead is disposed in such manner as to facilitate the conduction and dissipation of the heat generated at the friction surface.

Another object is the provision of an improved friction material, in which an inhibitive agent, such as lead, has been disposed in such manner as to render the amount of the exposed lead surface practically constant as the friction material is worn down by use.

Another object is the provision of an improved method of manufacture of friction materials which results in a superior product, which will not score the cooperating metal surfaces, and which may be made with a uniformity and accuracy in thickness, closely paralleling that attained by hard molded linings.

Another object is the provision of an improved friction lining which is adapted to prevent absorption or retention of water, thereby giving a quick recovery or substantially constant performance on brakes in wet weather.

Another object is the provision of an improved friction lining, including an inhibitive agent, such as lead, in which the lead is so interlaced that it is prevented from melting out in any quantity even under the most adverse conditions.

Another object is the provision of an improved friction-lining which has a substantially constant coefficient of friction at the different temperatures to which it is subjected in use.

Another object is the provision of an improved woven friction lining, which may be economically manufactured, and which has improved cooperating characteristics, including the elimination of scoring or squealing, the attainment of a substantially constant coefficient of friction under different conditions of temperature and humidity, better dissipation of the heat generated, constant wearing characteristics, and noiseless operation.

Other objects and advantages of the invention will be apparent from the following description and from the accompanying drawings, in which similar characters of reference indicate similar parts throughout the several views.

Referring to the drawings, of which there are five sheets:

Fig. 1 is a plan view of a piece of friction material constructed according to the present invention, as for example, a brake band;

Fig. 3 is a sectional view taken on the plane of the line 3—3 of Fig. 2, showing the arrangement of the warp threads of the upper ply;

Fig. 4 is a similar view taken on the plane of the line 4—4 of Fig. 2, illustrating the arrangement of the warp threads of the lower ply of a two-ply fabric;

Fig. 5 is a sectional view taken on the plane of the line 5—5 of Fig. 2, illustrating the arrangement of the binder threads of a two-ply fabric;

Fig. 6 is a sectional view taken on the plane of the line 6—6 of Fig. 2, illustrating the arrangement of the metallic lead wires in such a woven fabric;

Fig. 7 is a sectional view taken on the plane of the line 7—7 of Fig. 2, illustrating the arrangement of filler threads by means of a transverse section;

Fig. 8 is a diagrammatic line view, illustrating the manner of weaving a two-ply fabric;

Fig. 9 is an actual plan view of a piece of three-ply fabric lining;

Fig. 10 is a diagrammatic view similar to Fig. 2 of a three-ply fabric friction lining, with the threads loosened and spread apart to illustrate the manner of weaving;

Fig. 11 is a sectional view taken on the plane of the line 11—11 of Fig. 10, illustrating the arrangement of the warp threads of a three-ply fabric;

Fig. 12 is a sectional view taken on the plane of the line 12—12 of Fig. 10, showing the arrangement of the binder threads;

Fig. 13 is a sectional view taken on the plane of the line 13—13 of Fig. 10, showing the arrangement of a set of warp threads immediately adjacent the warp threads of Fig. 11;

Fig. 15 is a diagrammatic line view similar to Fig. 8, showing the arrangement of all of the threads in a three-ply fabric.

Figure 2:
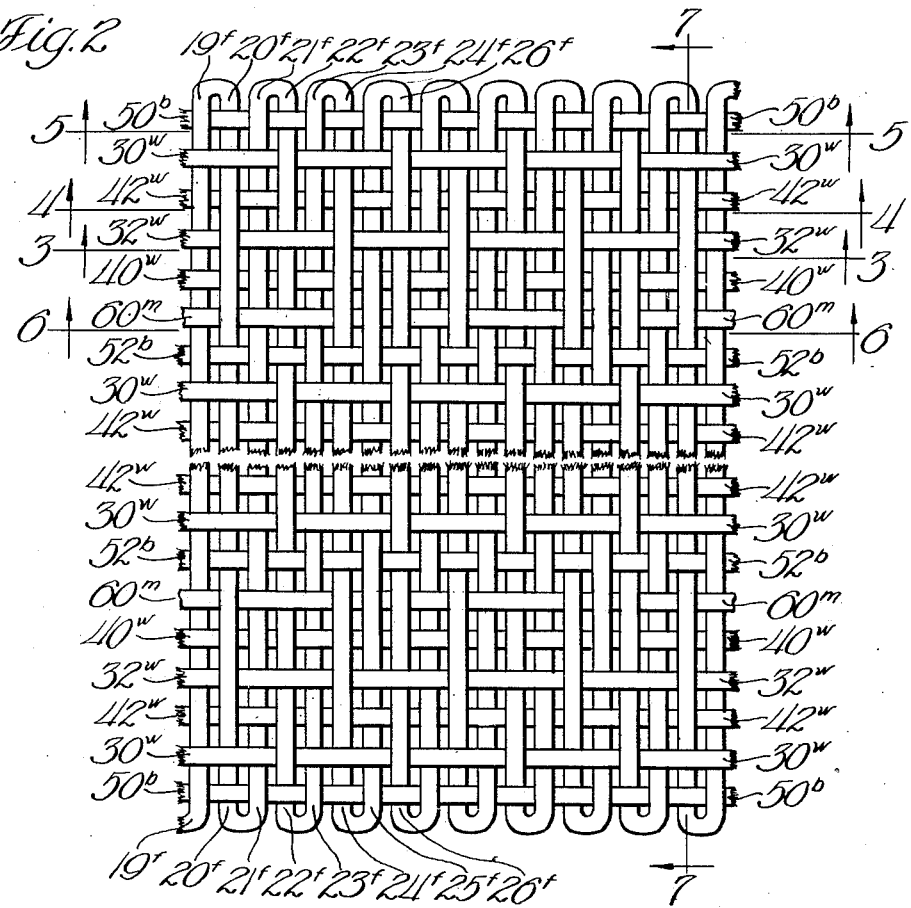
Fig. 2 is a diagrammatic plan view of the same material with the threads loosely disposed and spread out with respect to each other in order to illustrate the method of weaving the fabric of Fig. 1.
Figure 14:
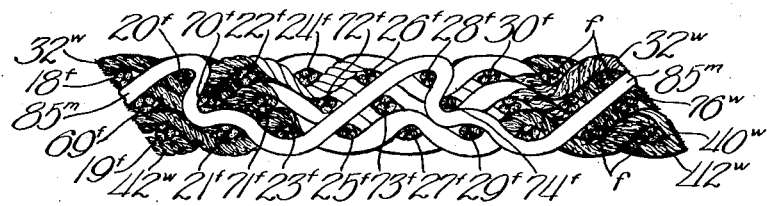
Fig. 14 is a sectional view taken on the plane of the line 14—14 of Fig. 10, showing the arrangement of the metallic members in a three-ply fabric.

The present invention is of particular importance in connection with woven fabric friction materials, and the threads of which the fabric consists are preferably formed of fibers of asbestos or chrysotile. A relatively small amount of cotton or other vegetable fibers is included with the asbestos fibers and intermingled among the asbestos fibers for the purpose of giving the twisted strands greater tensile strength, and each of the asbestos threads preferably includes one or more relatively thin reinforcing wires of non-corrodible metal, or metal dissimilar from the lead, which is preferably included as in inhibitive agent for the purpose of preventing the formation of abrasive drum scoring materials.

Thus each of the threads of which the present fabric is woven may consist of three twisted strands of asbestos, mixed with a small amount of cotton, and each thread may also include one or two fine brass wires, the three strands of asbestos being twisted about the brass wire as a base, although in the finished article it is found that the brass also frequently appears at the surface.

The brass wire also increases the tensile strength of the respective threads, and being interwoven and intermingled with all or most of the threads, greatly increases the strength of the finished fabric, so that the fabric does not disintegrate, although it may be cut at various points for the insertion of rivets or other purposes.

The friction lining constructed according to the present invention preferably includes wires or other members of practically pure metallic lead, and the lead wires are preferably interwoven with the other threads of the fabric in the manner which will be described hereinafter, and which greatly improves the operating characteristics of the friction material. Besides pure metallic lead, lead alloys in which lead predominates may be used to secure some results, but the best results are secured by pure metallic lead.

Lead or lead alloy wires may also be twisted in with the strands used in forming the threads for the warp, the binders or filler threads, thereby uniformly distributing the metallic lead throughout the body of the fabric.

The lead thus interwoven is exposed at the face of the friction material at the regularly spaced and uniformly distributed points, and is adapted to come into direct contact with the cooperating metallic frictional surface in such manner as to polish the metallic braking surface, prevent erosion, aid in the conduction and dissipation of heat, and maintain a substantially constant coefficient of friction under widely varying conditions of temperature and pressure.

One of the effects of lead in combination with asbestos is the compensation of the variation in the coefficient of friction of the asbestos under increased temperature. The coefficient of friction of asbestos on steel decreases with an increase of temperature, while the coefficient of friction of lead on steel increases with an increase of temperature, and consequently, the presence of the metallic lead at the friction surface tends to compensate for the variation in the coefficient of friction of the asbestos on steel.

Another and more important effect of the use of lead in combination with asbestos lies in the fact that lead acts as an inhibitive agent for preventing the formation of abrasive particles, such as silicates, carbides and slags, which would otherwise be formed out of the materials present in ordinary asbestos by the dehydration of the asbestos under high temperature and pressure. As previously stated, such abrasive and destructive materials are not formed by the friction linings constructed according to the present invention, in which lead is employed, and the one explanation of this action of lead in connection with asbestos may be derived by analogy from the fact that a compound of lead is also known to be an inhibitive agent for preventing the formation of carbon in internal combustion engines.

Referring to Fig. 8, all of the threads of a two-ply fabric of friction material are diagrammatically illustrated in this figure by the use of lines and circles for the purpose of facilitating a better understanding of the exact structure of the fabric. This is made necessary by the fact that the fabric itself is so compactly interwoven and compressed that it would be practically impossible to distinguish the different threads in an actual section of the finished fabric.

Since there is a limited number of threads of different kinds, the filler threads of Fig. 8 have been designated by the small letter $(f)$, the warp threads by the small letter $(w)$, the metallic threads or wires by the letter $(m)$, and the binder threads by the letter $(b)$, and the numerals employed in the other figures are used in connection with these letters, so that it is possible to ascertain from the letters used exactly which kind of thread is indicated by the character used.

In order to give the friction material sufficient body and thickness to permit long use and wear, without wearing the lining away to become too thin for use, the friction material preferably includes two or more plies, each of which includes filler threads $(f)$ and warp threads $(w)$, but it should also be understood that I do not wish to limit the invention to any particular number of plies. Both plies of the friction fabric are preferably similar in form and may include a plurality of transverse filler threads $20f$; $22f$, 24f, 26f, etc., in the upper ply, while the filler threads of the lower ply may be designated 21f, 23f, 25f, 27f, etc.

The diagrammatic view of Fig. 8 is a sectional view taken longitudinally of the fabric, and consequently, the ends of the transverse or filler threads are seen, while the warp threads (w) are seen in elevation, and it will be understood that any number of warp threads may be employed, depending upon the exact width of fabric desired.

The warp threads, two of which in each layer are shown diagrammatically in Fig. 8, may be designated 30w, 32w, etc., while the warp threads in the lower ply may be designated 40w, 42w, etc. It will be observed that the warp thread 30w passes over the filler thread 20f, under filler thread 22f, over filler thread 24f, and so on throughout the length of the fabric, while the warp thread 32w passes under the filler thread 20f, over the filler thread 22f, under 24f, etc. The warp threads thus cross each other in between the filler threads and form a ply of the fabric in the usual manner of weaving ordinary fabric.

Since the arrangement of the lower ply is exactly the same, a detailed explanation of the relation of the warp threads and filler threads in the lower ply is unnecessary, but it should be noted that the filler thread 20f is actually carried from one side of the fabric to the other; thence back to the first side, and so on back and forth, traversing the fabric many times, and hence the filler threads 21f, 22f, 23f, are all continuations of the same thread 20f.

The binder threads (b) are interwoven with the threads previously described, and located at regularly spaced intervals or lines longitudinally of the fabric.

Again referring to Fig. 8, it will be observed that the binder thread which has been designated 50b passes over the filler thread 20f in the upper ply, under the filler thread 21f in the lower ply, over the next filler thread 22f in the upper ply, and so on ad infinitum, thereby binding both of the plies together to form a closely woven fabric.

The metallic lead wires or threads (m) preferably extend from one side of the fabric to the other, in order to conduct the heat away from the friction surface, and are also preferably located with certain parts extending diagonally through the thickness of the fabric, in order to present an increased area of lead at a surface over the ordinary cross-section of the thread when the fabric has been worn down through its top surface. Thus, in Fig. 8, the metallic wire 60m extends over the filler thread 22f, downward through the fabric, skipping the filler 23f and passing outside the filler thread 25f, diagonally upward through the fabric, skipping filler threads 26f, 28f, and passing outside filler thread 30f, etc.

Referring to Fig. 2, all of the threads of the two-ply fabric are shown in this figure, slightly spread apart and very loosely woven with respect to each other, so as to render visible all of the separate threads which have been given characters corresponding to Fig. 8. It will thus be observed that the filler thread 20f, passing upward in Fig. 2, and turning downward, becomes the filler thread 21f, after which it traverses the fabric and returns as filler thread 22f, etc. The first longitudinal thread at the edge of the fabric may be a binder thread 50b, and by comparing Figs. 2 and 8, it will be observed that in both cases, binder 50b passes over filler 20f, under filler 21f, over filler 22f, etc.

The next thread may be warp thread 30w, which passes over fillers 20f, 21f, under filler 22f, over fillers 23f, 24f, 25f, under filler 26f, etc.

The next thread may be the warp thread 42w, passing under filler 20f, over filler 21f, under fillers 22f, 23f, 24f, over filler 25f, etc.

The next thread may be warp thread 32w, which like warp thread 30w, passes over three filler threads and under one filler thread, as seen from the top.

The next thread is a warp thread 40w, and as seen from the top in Fig. 2, it passes under three filler threads and over one filler thread alternately.

The next thread may be the metallic wire 60m, which alternately passes over three fillers and under four fillers as viewed from the top, exposing a succession of elongated wire surfaces 60m at both the top and the bottom of the fabric.

It will thus be observed that in the present embodiment, one binder thread is preferably used for each set of four warp threads and one metallic wire, and the balance of the fabric illustrated in loose formation in Fig. 2 may be woven in exactly the same manner as the section just described.

Referring to Figs. 3 and 4, these are sectional views taken adjacent the longitudinally extending warp threads of Fig. 2, illustrating the relation of the warp threads of the two different plies with the upper ply foremost. Fig. 4 is a similar view with the warp threads of the lower ply foremost in the view.

Referring to Fig. 5, it will be observed that the binder threads pass alternately from the top to the bottom of the fabric to combine the two plies of the fabric closely together.

Referring to Fig. 6, it will be seen that when the threads of the fabric are drawn closely together, the lead wires are exposed at the points 60m above and below, and between the top and bottom of the fabric the wire passes downward diagonally; thence, to the surface of the bottom; thence, upward diagonally over a filler and under another filler, and thence, diagonally to the upper surface.

Since the metallic wires extend diagonally through the fabric from top to bottom, as soon as the exposed portion 60m of the wire and the surrounding fabric have been sufficiently worn away, the ends of two exposed wires will be seen adjacent the points 60m, but the ends of the wires will be diagonal sections of a cylinder, thereby increasing the area over the ordinary cross-section of the wire. At the same time, the wire is so interwoven between the successive filler threads that the portions 60m may be entirely worn away, exposing the ends of the pieces of wire without any possibility of the wire pieces being separated from the fabric. That is, the wire is so intimately intermingled with the fabric that it may be worn into many different pieces without destroying the effectiveness of the friction lining, and one of the plies of the material described which may be adjacent the supporting surface or shoe, may serve as a supporting layer which will remain intact even after the outer or frictional engaging layer has been entirely worn away.

Referring to Fig. 15 the three-ply friction fabric illustrated diagrammatically in this view includes an additional layer or ply having similarly arranged warp and filler threads. In order to simplify the description, the upper and lower warp filler threads have been given the same indicating characters as those already described, while the filler threads of the middle ply of this fabric may be designated 69f, 70f, 71f, 72f, etc.

The warp threads of the middle ply may be designated 76w, 77w, and these warp threads are associated with other filler threads 69f, 70f, 72f in a manner similar to that previously described.

It should be noted that the binder threads 80f pass under the filler 19f, over fillers 20f and 70f, and so forth, until the binder has passed under filler 23f, after which it passes over filler 24f only. That is, the binders pass over two fillers and under one filler three times, after which it passes under two fillers (72f, 25f), and the same arrangement is repeated indefinitely. The specific arrangement of the binder threads aids in more closely binding the plies together to prevent relative movement between them.

The metallic wires 85m pass over fillers 20f, thence downward under filler 70f, thence diagonally over filler 21f and under filler 23f, thence diagonally upward under fillers 72f and 26f and over fillers 25f, 73f, 28f, after which the same arrangement is duplicated indefinitely. Although one side has been referred to as the top, and the other as the bottom, either side of the friction resistive fabric may be used for engagement with the metal drum, and the lower side in Fig. 15 is peculiarly adapted to provide an increased area of lead wires, due to the substantially horizontally extending portion of the lead wire between certain fillers, such as, for example, 70f and 23f.

The actual arrangement and location of the three-ply warp threads and filler threads is illustrated in detail in Fig. 13, showing a section taken adjacent the warp threads in the loosely woven fabric of Fig. 10.

The actual arrangement of all of the threads in loosely woven arrangement is illustrated in Fig. 10, and it will be observed that in the three-ply fabric one metallic wire and one binder is interwoven with a set of six warp threads. Of course, the successive filler threads designated by different numerals all consist of extensions of the same thread traversing the fabric from side to side in different positions.

Referring to Fig. 4, the actual location of the metallic wire threads is approximately illustrated in this figure, which represents a section taken adjacent the metallic wires, but as a matter of fact, the sections shown through the fabric are illustrated with the threads in loose arrangement, corresponding to Figs. 2 and 10.

It should be understood, therefore, that any number of different plies may be added to the fabric, or fabric of the single ply might be constructed in accordance with the foregoing disclosure, but at least two plies of fabric are preferred in order to give sufficient thickness and body for good service.

After the fabric has been woven, as described, and stretched so that the various threads are closely and compactly interwoven and strained against each other, the friction material is thoroughly dried out and impregnated with a saturating compound, which may consist of a mixture of bituminous material, such as gilsonite and other natural and petroleum asphalts, with drying pitches and resins, such as, linseed, Chinawood oil, stearine, pitch, cottonseed pitch, animal pitch, etc., thinned to the required consistency with coal tar or petroleum solvent.

The impregnated fabric is also subjected to heat and pressure for drying out excess material, compacting the fibers, and giving the friction material a substantial uniform thickness.

It will thus be observed that I have invented an improved friction material, including asbestos and metallic lead wires, which are so intimately interwoven that the wires are retained in the lining even after parts of the wire are worn away. The metallic wires are adapted to aid in the conduction and dissipation of the heat generated at the friction surface, and the metallic lead acts as an inhibitive agent for preventing the formation of abrasive slags, silicates and carbides at the high temperatures and pressures caused by braking. Although the metallic threads in the present embodiment have been located in such manner that they may be termed "binder threads", it should also be noted that the metallic wires may be used in place of certain of the other binder threads (*b*), in place of the warp threads (*w*), or in place of certain filler threads at regularly spaced intervals. In the latter case, the metallic filler threads should preferably be so arranged that they appear at the surface at regular periodic intervals.

The metallic lead is adapted to present a substantially constant exposed area at the friction surface as the band is worn down. and it is also adapted to compensate for the decreasing coefficient of friction of asbestos on steel or like material at high temperatures, thereby giving a constant braking performance. The lead and impregnated compound both tend to prevent the absorption or retention of water on the friction surface, and the present friction material sheds water quickly, thereby giving a quick recovery and uniform brake performance in wet weather.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a brake lining, the combination of a woven fabric comprising warp and filler threads of asbestos fibers interwoven with each other, and a plurality of lead wires interwoven with said warp and filler threads and exposed at the surface of said fabric at uniformly spaced points, said fabric having a plurality of layers and said lead wires being disposed as binder members extending diagonally into said fabric from one side below predetermined threads, to present a substantially constant exposed area of lead as said lining wears down, and to prevent separation of the lead wires from said fabric when the wires are worn into separate pieces.

2. A woven brake lining comprising a plurality of transverse filler threads, a plurality of longitudinal warp threads interwoven with the filler threads to form plies of fabric, a plurality of binder threads successively interwoven with the filler threads of different plies and extending longitudinally of the lining, and a plurality of soft metallic wires extending longitudinally of said lining and exposed at regularly spaced points on the surface of said lining, said wires extending diagonally between predetermined points on one side of said lining to predetermined points on the other side of said lining to form exposed metal surfaces of substantially constant area when the lining is worn down.

3. A woven brake lining comprising a plurality of transverse filler threads, a plurality of longitudinal warp threads interwoven with the filler threads to form plies of fabric, a plurality of binder threads successively interwoven with the filler threads of different plies and extending longitudinally of the lining, a plurality of soft metallic wires extending longitudinally of said lining and exposed at regularly spaced points on the surface of said lining, said wires extending diagonally between predetermined points on one side of said lining to predetermined points on the other side of said lining to form exposed metal surfaces of substantially constant area when the lining is worn down, said lining being impregnated with a saturating compound and compressed into a compact strip.

In witness whereof, I hereunto subscribe my name this 21st day of November, 1929.

RUDOLF L. R. WILD.